United States Patent [19]

March et al.

[11] Patent Number: 5,658,519
[45] Date of Patent: Aug. 19, 1997

[54] REINFORCED PLASTIC PILING AND METHOD AND APPARATUS FOR MAKING SAME

[75] Inventors: Frank A. March, Leesburg; John H. Menge, Winchester, both of Va.; Russell J. Gould, Mt. Prospect, Ill.

[73] Assignee: Seaward International, Inc., Clearbrook, Va.

[21] Appl. No.: 477,432

[22] Filed: Jun. 7, 1995

Related U.S. Application Data

[63] Continuation-in-part of Ser. No. 90,006, Jul. 12, 1993, abandoned.

[51] Int. Cl.$^6$ .................................................. B29C 47/02
[52] U.S. Cl. ................ 264/2.77; 264/45.8; 264/45.3; 264/135; 264/275; 428/323; 428/332
[58] Field of Search ........................ 264/135, 46.1, 264/46.2, 174, 338, 46.5, 45.8, 271.1, 275, 45.3, 277, 278, 11, 54; 428/323–332, 408

[56] References Cited

U.S. PATENT DOCUMENTS

| | | |
|---|---|---|
| Re. 31,354 | 8/1983 | Eckner . |
| 3,126,035 | 3/1964 | Espetvedt . |
| 3,200,554 | 8/1965 | Goodman et al. . |
| 3,253,066 | 5/1966 | Hardy et al. . |
| 3,306,960 | 2/1967 | Weissman et al. . |
| 3,342,913 | 9/1967 | Engel . |
| 3,425,092 | 2/1969 | Jun Taga . |
| 3,448,585 | 6/1969 | Vogelsang . |
| 3,495,565 | 2/1970 | Gustavii . |
| 3,528,458 | 9/1970 | Gaeckel . |
| 3,606,635 | 9/1971 | Benteler et al. . |
| 3,611,736 | 10/1971 | Goodman . |
| 3,619,436 | 11/1971 | Gruss . |
| 3,630,037 | 12/1971 | Howard . |
| 3,636,718 | 1/1972 | Keats . |
| 3,639,424 | 2/1972 | Gray, Jr. et al. . |
| 3,736,759 | 6/1973 | Blose . |
| 3,764,642 | 10/1973 | Boutillier . |
| 3,791,912 | 2/1974 | Allard . |
| 3,879,505 | 4/1975 | Boutillier et al. . |
| 3,922,828 | 12/1975 | Patton . |
| 3,933,960 | 1/1976 | Cameron et al. . |
| 3,978,181 | 8/1976 | Vahle . |
| 3,993,265 | 11/1976 | Parks . |
| 4,110,989 | 9/1978 | Selkirk . |
| 4,141,951 | 2/1979 | Beckman . |
| 4,146,562 | 3/1979 | Fukushima et al. . |
| 4,187,352 | 2/1980 | Klobbie . |
| 4,244,156 | 1/1981 | Watts, Jr. . |
| 4,252,471 | 2/1981 | Straub . |
| 4,306,821 | 12/1981 | Moore . |
| 4,323,528 | 4/1982 | Collins . |
| 4,351,786 | 9/1982 | Mueller . |
| 4,394,338 | 7/1983 | Fuwa ........................................ 264/135 |
| 4,471,215 | 9/1984 | Blumer . |
| 4,485,057 | 11/1984 | Kristensson et al. . |
| 4,512,683 | 4/1985 | Cosenza . |

(List continued on next page.)

FOREIGN PATENT DOCUMENTS

| | | |
|---|---|---|
| A-85 701/82 | 1/1983 | Australia . |
| 540 803 | 5/1993 | European Pat. Off. . |
| 3438448 | 4/1986 | Germany . |
| WO82/00267 | 2/1982 | WIPO . |
| WO93/01034 | 1/1993 | WIPO . |

OTHER PUBLICATIONS

Roney Heinz, Civil Engineering, "Plastic Piling", vol. 63, No. 4, dated Apr. 1993, pp. 63–65.

*Primary Examiner*—Merrick Dixon
*Attorney, Agent, or Firm*—Wigman, Cohen, Leitner & Myers, P.C.

[57] ABSTRACT

An elongated, substantially rigid member suitable for use as a marine piling is formed by feeding a substantially solid plastic core into a die and continuously extruding a molten plastic into the die so that the molten plastic surrounds and bonds to the plastic core and to reinforcing bars fed into the die at positions surrounding the plastic core. The plastic core acts as a heat sink to facilitate cooling of the molten plastic and deters bending of the member while cooling.

20 Claims, 2 Drawing Sheets

U.S. PATENT DOCUMENTS

| | | |
|---|---|---|
| 4,585,681 | 4/1986 | Kidera et al. . |
| 4,604,250 | 8/1986 | Ecker . |
| 4,606,953 | 8/1986 | Suzuki et al. . |
| 4,626,189 | 12/1986 | Hammer et al. . |
| 4,629,597 | 12/1986 | Charlebois et al. . |
| 4,659,255 | 4/1987 | Shiraishi et al. . |
| 4,697,957 | 10/1987 | Hellmers . |
| 4,698,193 | 10/1987 | Bernitz et al. . |
| 4,708,527 | 11/1987 | Inhofe, Jr. et al. . |
| 4,708,623 | 11/1987 | Aoki et al. ............................. 425/202 |
| 4,713,129 | 12/1987 | Inhofe, Jr. et al. . |
| 4,721,418 | 1/1988 | Queen . |
| 4,725,165 | 2/1988 | Langran . |
| 4,738,808 | 4/1988 | Hammer et al. . |
| 4,743,142 | 5/1988 | Shiraishi et al. . |
| 4,755,247 | 7/1988 | Mudge . |
| 4,762,584 | 8/1988 | Andreasen et al. . |
| 4,769,286 | 9/1988 | LeNoane ............................. 428/372 |
| 4,779,389 | 10/1988 | Landers . |
| 4,797,237 | 1/1989 | Hammer et al. . |
| 4,818,148 | 4/1989 | Takeda et al. . |
| 4,824,497 | 4/1989 | Tilman . |
| 4,824,627 | 4/1989 | Hammer et al. . |
| 4,857,371 | 8/1989 | McClintock . |
| 4,902,548 | 2/1990 | Cholat-Serpoud et al. . |
| 4,941,775 | 7/1990 | Benedict . |
| 4,983,072 | 1/1991 | Bell, Jr. . |
| 5,051,285 | 9/1991 | Borzakian . |
| 5,087,154 | 2/1992 | Crawford . |
| 5,096,645 | 3/1992 | Fink . |
| 5,126,167 | 6/1992 | Matsuno et al. . |
| 5,180,531 | 1/1993 | Borzakiah ............................. 264/45.3 |
| 5,194,212 | 3/1993 | Bonnett . |
| 5,202,071 | 4/1993 | Nakamura et al. ..................... 264/137 |
| 5,217,800 | 6/1993 | Pentecost . |
| 5,238,633 | 8/1993 | Jameson ............................. 264/211.23 |
| 5,273,819 | 12/1993 | Jex ......................................... 428/297 |
| 5,275,776 | 1/1994 | Hara et al. ............................. 264/258 |
| 5,282,731 | 2/1994 | Dinter . |
| 5,283,026 | 2/1994 | Okumura et al. . |
| 5,307,604 | 5/1994 | Tasso . |
| 5,308,571 | 5/1994 | Stiles et al. . |
| 5,320,788 | 6/1994 | Schneider et al. ........................ 264/1.5 |
| 5,324,377 | 6/1994 | Davies ..................................... 156/180 |
| 5,358,680 | 10/1994 | Boissonnat et al. .................. 264/177.2 |
| 5,374,385 | 12/1994 | Binse et al. ............................. 264/136 |

REINFORCED PLASTIC PILING AND METHOD AND APPARATUS FOR MAKING SAME

CROSS REFERENCE TO RELATED APPLICATION

This is a continuation-in-part of U.S. patent application Ser. No. 08/090,006, filed Jul. 12, 1993 now abandoned.

BACKGROUND OF THE INVENTION

A. Field of the Invention

The present invention generally relates to elongated plastic members formed by extrusion, and particularly relates to reinforced plastic marine pilings.

B. Discussion of the Related Art

Traditional marine pilings are made of steel, concrete, or wood. Steel and concrete are very heavy and expensive and do not have desired resiliency for fendering applications. Steel is especially subject to rapid corrosion in a marine environment. Wood suffers from rapid erosion and is subject to attack by marine boring animals which deplete its effectiveness. In order to prolong its useful life, wood is typically treated with a preservative, such as creosote. However, creosote and other preservatives are detrimental to the environment. Furthermore, given the recent efforts for preservation of forests, the use of wood pilings is not desirable.

Pilings made of plastic have been proposed. For example, U.S. Pat. No. 5,051,285 to Borzakian discloses a structural plastic member suitable for use as a plastic piling. A steel pipe is positioned in a mold and coated with thermoplastic resins, fillers, and additives. The plastic is cooled and the resultant plastic member is then removed from the mold.

This approach suffers many disadvantages. Marine pilings typically vary in length from ten to eighty feet and diameter as small as three inches depending on a specific application. As a result, a piling manufacturer must either construct molds of varying sizes, which is very expensive, or use a single mold to produce pilings of a certain length and diameter and join multiple pilings longitudinally to achieve the desired length.

The use of a mold also limits the length of a piling which can be produced. The plastic in the mold must be in a flowable state throughout the entire process of filling the mold. The flowable state becomes difficult to maintain as the length and size of the structure is increased. Additionally, the adhesion of the plastic to the pipe is difficult to control in such an operation where the plastic melt is introduced at one end of an elongated mold and required to stick to the metal core pipe at the opposite end, which is typically at least ten feet away. It is believed that such a formed structure would contain hollows or at least weak areas formed by interfaces between melt streams of different relative ages.

Because the length of the member is limited by mold size, the structure disclosed in Borzakian must be connected to other such structures to form pilings of the length required for a given application. Such joining methods and means are expensive, cumbersome and leave potential seams for water and other environmental factors to attack the metal pipe core.

Regardless of the production method, plastic pilings must be properly cooled so that the plastic maintains its appropriate shape. Such a cooling process may be lengthy, particularly since pilings typically exceed 10 inches in diameter and 30 feet in height. If cooling time is sacrificed, the piling may bend or sag from its desired shape.

Accordingly, there is a need for a piling structure that is corrosion resistant or corrosion proof, impervious to marine life, has desirable structural integrity and resiliency/toughness under side impact, is environmentally safe, and preserves natural resources. There is also a need for a process for making a piling structure that can produce pilings of a desired size without requiring multiple molds of varying sizes or the lengthwise coupling of several piling sections, and can properly and efficiently cool the piling while maintaining the desired shape.

SUMMARY OF THE INVENTION

Accordingly, the present invention is directed to a elongated member that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the method and apparatus particularly pointed out in the written description and claims hereof as well as the appended drawings.

To achieve these and other advantages and in accordance with the purpose of the invention, as embodied and broadly described, the invention includes a plastic core having a central longitudinal axis and a peripheral surface and a plastic shell surrounding the plastic core and bonded to the peripheral surface of the plastic core. A plurality of rigid reinforcing bars are embedded within the plastic shell in positions substantially parallel to the central longitudinal axis of the plastic core.

The elongated member is made by continuously extruding a molten plastic into a die and feeding a substantially solid plastic core into the die, the core having a lower temperature than the molten plastic. A plurality of reinforcing bars are also fed into the die so that the reinforcing bars are substantially parallel to a longitudinal axis of the die and are positioned around a peripheral surface of the core. The molten plastic entering the die surrounds and bonds to the plurality of reinforcing bars and the peripheral surface of plastic core. The molten plastic is then cooled so that the molten plastic, the plastic core, and the plurality of reinforcing bars are formed into an elongated member having a predetermined cross-section, with the plastic core acting as a heat sink to facilitate cooling of the molten plastic.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

DETAILED DESCRIPTION

Reference will now be made in detail to the present preferred embodiments of the invention, examples of which are illustrated in the accompanying drawings.

Figure 1:
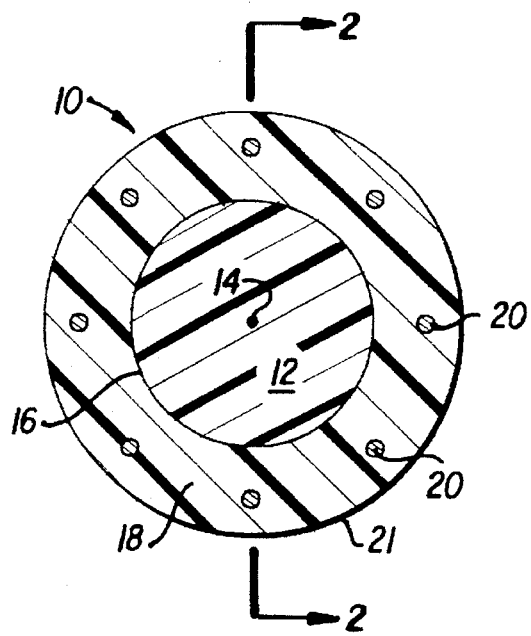
FIG. 1 is a cross-sectional view of an embodiment of an elongated member of the present invention.
Figure 2:
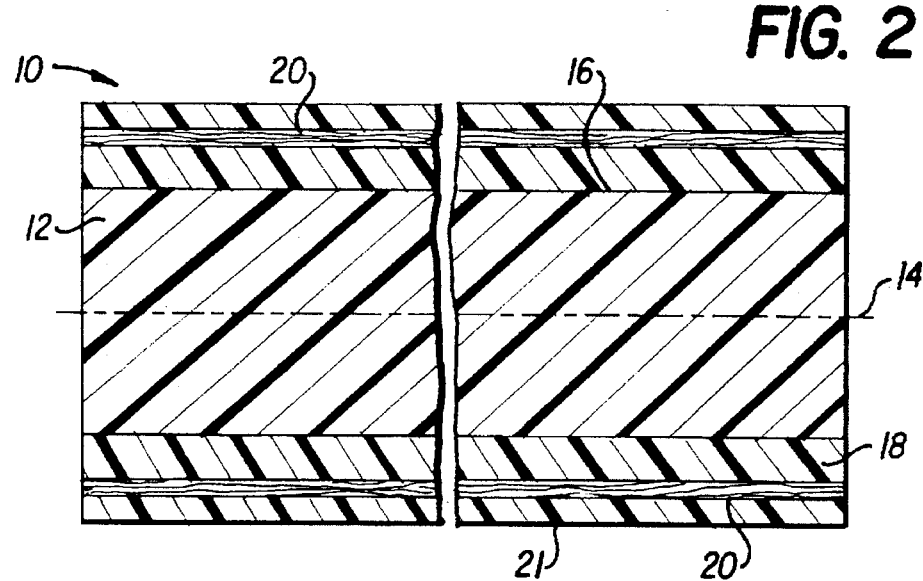
FIG. 2 is a longitudinal sectional view of the elongated member shown in FIG. 1 taken along the lines 2—2 of FIG. 1.

An exemplary embodiment of the elongated member of the present invention is shown in FIGS. 1 and 2 and is designated generally by reference numeral 10. Elongated member 10 includes a plastic core 12 having a central longitudinal axis 14 and a peripheral surface 16. A plastic shell 18 is bonded to the peripheral surface 16 of the core 12 and includes a peripheral surface 21. Rigid reinforcing bars 20 are embedded within the plastic shell 18 to stiffen the composite structure.

The plastic core 12 and plastic shell 18 are plastic matrices composed of suitable thermoplastic resins, such as high density polyethylene (HDPE), low density polyethylene (LDPE), linear low density polyethylene (LLDPE), polypropylene (PP), thermoplastic polyester (PET), or combinations thereof. A composition of 100% HDPE is one example of a plastic matrix that may used.

Virgin and recycled thermoplastic resins may be used. Recycled thermoplastic resins are preferable because of their availability, low cost, and performance. Such recycled thermoplastic resins are available from both post-consumer and post-industrial sources. The plastic core may be composed of lower quality plastic materials than that of the plastic shell, thereby reducing production costs, because its strength is not as important as the strength of the plastic shell.

Various additives can be mixed with the plastic materials to enhance the performance of the structural member. These additives, which are primarily added to the plastic matrix for the plastic shell 18, include materials, such as antioxidants, colorants, UV protectors, fungicides and compatibilizers.

Fillers may be added to the plastic matrices to reduce the amount of plastic needed, provide stiffness, and, in some cases, to enhance performance. Fillers include mineral products such as calcium carbonate, talc, chopped fiberglass, and silica, as well as waste products such as wood chips, saw dust, ground foam scraps, and ground paper.

The plastic matrices may also be foamed to reduce their density by up to about 50 to 70%. Foaming can be effected by including one or more chemical blowing agents in the plastic mixtures. A chemical blowing agent reacts with heat in an extruder to liberate gases, such as water vapor, carbon dioxide, and nitrogen. Typical chemical blowing agents are well known in the art and include, for example, azodicarbonamide and mixtures of citric acid and sodium bicarbonate. Physical blowing agents such as nitrogen gas, carbon dioxide, alkanes, and halogenated hydrocarbons can also be used.

As shown FIGS. 1 and 2, a plurality of reinforcing bars 20 are disposed within the plastic shell 18 and are substantially parallel to the central longitudinal axis 14 of the structural member. At least four reinforcing bars are preferably used. The diameter and composition of the reinforcing bars are chosen to give the desired strength and corrosion properties.

The reinforcing bars may be steel or fiberglass rods. The reinforcing bars preferably have an exterior profile, such as transverse ribs, to increase bonding between the reinforcing bars and the plastic shell, and thereby deter slippage between the bars and the plastic shell during cooling. Rebar such as those used for concrete reinforcement has such a profile (i.e., transverse ribs) and may be used. Steel rebar is also relatively inexpensive. For increased corrosion resistance, the steel rebar can be coated with any well-known protective coatings, such as polyester (e.g., Scotch Kote™ from 3M).

For optimum corrosion resistance and metal-free (e.g., non-magnetic) construction, pultruded fiberglass rods or rebar may be used. Glass fibers are pultrusion cast continuously in a matrix of a thermoset resin such as polyester or vinyl ester. For example, individual fibers are fed into a resin bath and are then fed into a curing and shaping die that heats and shapes the fiberglass fibers (preferably two or more fibers for each rod) soaked with the thermoset resin to form pultrusion cast fiberglass rods, as is known in the art. The cured or partially cured rods may also be wrapped with a fabric material, such as polyester, and then helically wrapped with fiberglass fibers to form a profile.

The reinforcing bars 20 are placed in the plastic shell at locations where they will contribute the most to the strength and stability of the structural member without being exposed to the environment through scraping, cutting, or bending of the structural member. The reinforcing bars are preferably placed no closer than 0.25 inches from the outer surface of the structure to be reasonably safe from potential exposure to environmental elements, and are preferably placed between zero and 0.5 inches from the peripheral surface of the plastic core. The reinforcing bars are also preferably arranged concentrically around the central longitudinal axis 14 of the elongated member, as shown in FIG. 1.

Figure 3:
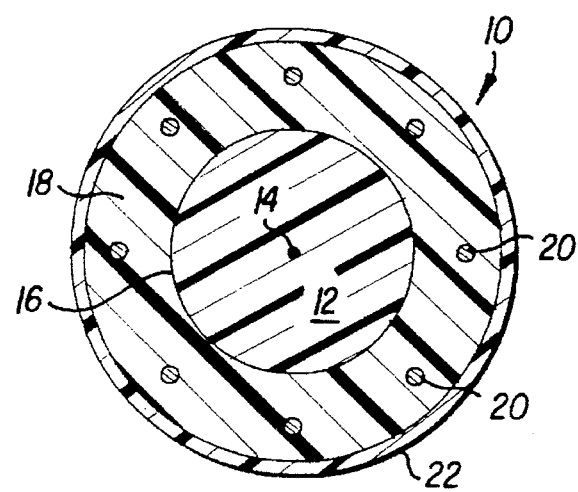
FIG. 3 is a cross-sectional view of another embodiment of the elongated structural member of the present invention.

As shown in FIG. 3, the elongated member 10 may include a skin layer 22 formed on the peripheral surface 21 of the plastic shell 18. The skin layer may be composed of an unfoamed plastic matrix that provides a structural, protective skin and allows the plastic shell to be foamed to lower densities than if the complete structure was foamed. The matrix of the skin layer also preferably includes additives such as UV protectors, antioxidants, and fungicides, making it unnecessary to include them in the matrix of the plastic shell.

Figure 4:
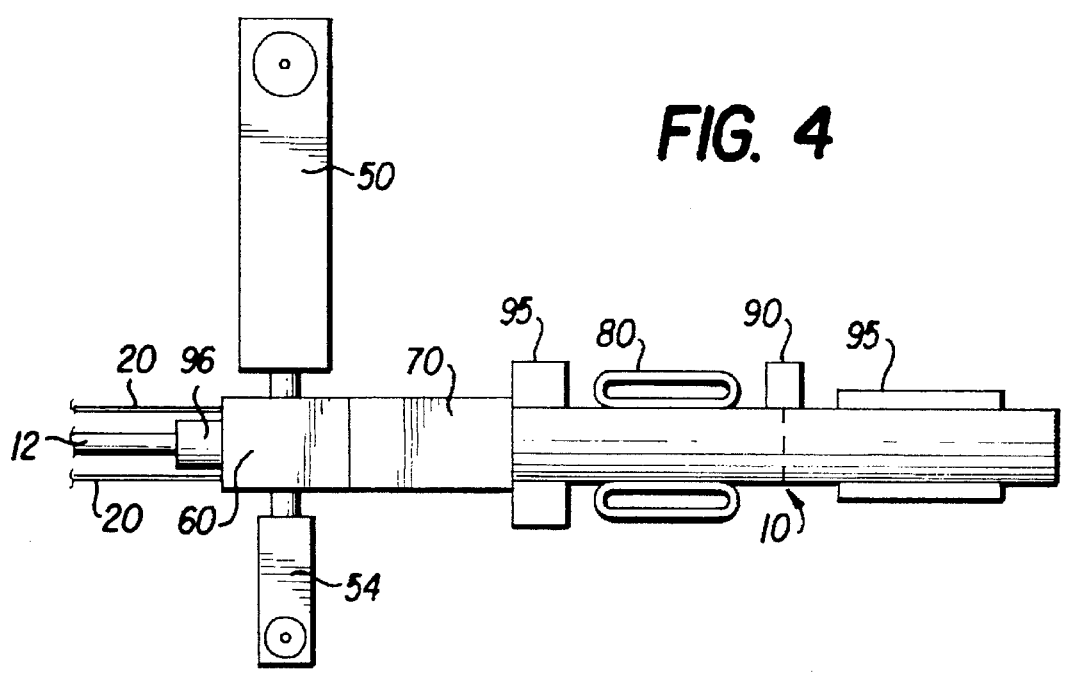
FIG. 4 is a diagram of a system for making an elongated member of the present invention.
Figure 5:
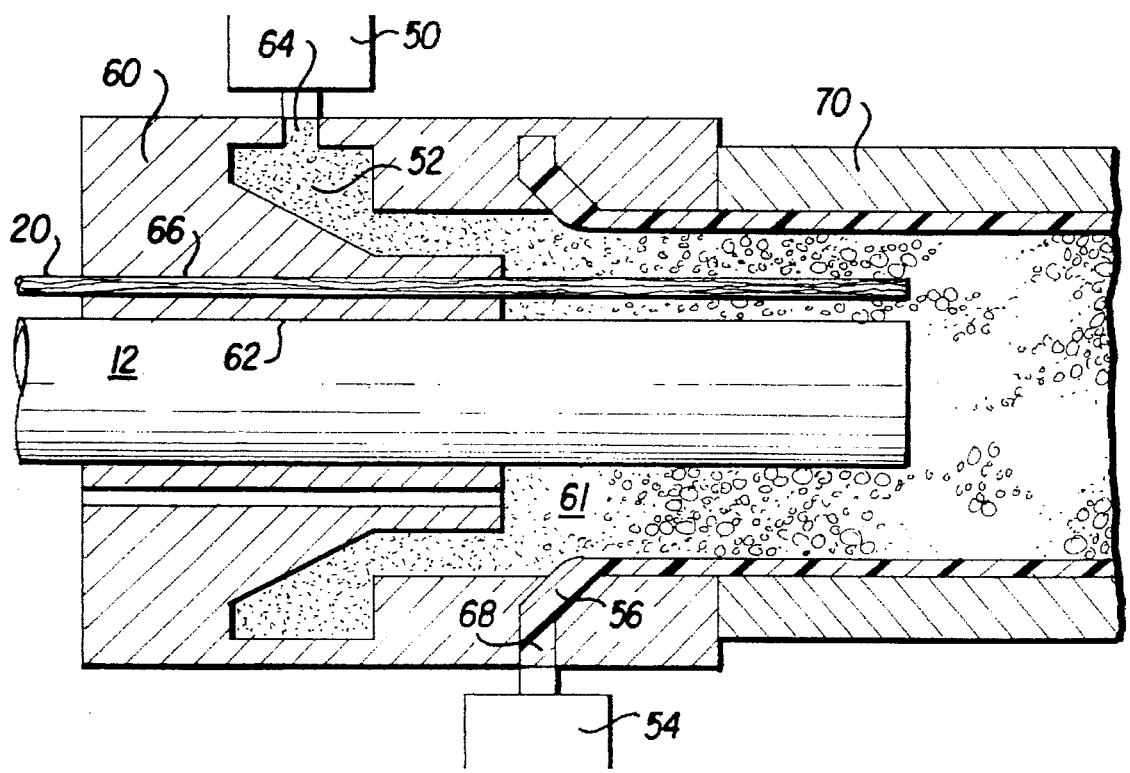
FIG. 5 is a partial longitudinal sectional view of a die used for making an elongated member of the present invention.

An apparatus for making the elongated member of the present invention is illustrated in FIGS. 4 and 5 and includes an extruder 50, die 60, shaping and cooling station 70, puller 80, and cutter 90. Additional cooling stations 95 may be included either before and/or after the puller to further cool the plastic member.

The plastic shell 18 is formed by feeding a desired mixture of plastic resins, fillers, additives, and blowing agent to the extruder 50. The extruder melts and mixes the components to form a melt 52, which is fed to the die 60.

The melt 52 is subsequently shaped and cooled to form the desired product, such as a marine piling. Since a marine piling is typically at least 10 inches in diameter, the plastic melt must be rapidly cooled or otherwise supported so that the product does not bend or sag when exiting the die and shaping and cooling station 70. To facilitate cooling and prevent bending, the plastic core is preformed before entering the die and acts not only as a support for the plastic melt forming the plastic shell, but also as a heat sink to more rapidly cool the melt, thereby increasing production line speed. Although not critical, the cross-sectional area of the core should preferably be about half of the total cross-sectional area of the elongated member.

FIG. 5 is a cross-sectional view of die 60, which is illustrated as a crosshead die having an interior portion 61 for receiving the molten plastic, the plastic core, and the reinforcing bars, a central opening 62 through which the plastic core passes as it is fed into the interior portion, a lateral opening 64 coupled to the extruder 50, and a plurality of ports 66 parallel to the central opening 62 for receiving and supporting the reinforcing bars as they are fed into the interior portion 61 of the die 60 by a feeding apparatus (not shown). If an outer skin layer is to be formed on the plastic shell, a second extruder 54 is coupled to a second lateral opening 68 of the die.

The plastic core is in a substantially solid or solid state as it enters the die. The core may be formed in sections by molding or as a continuous piece by extruding processes. Although not required, the core may include reinforcing elements or fibers to increase its stiffness. Since the core acts as a heat sink for removing thermal energy from the molten plastic during the cooling and shaping process, it must have a lower temperature than the molten plastic when entering the die. Room temperature is sufficient and provides for ease in handling the core. Optionally, the core may be chilled.

To increase bonding between the core and the molten plastic forming the plastic shell, the peripheral surface of the core may be heated to its melting point to partially melt the surface of the core. Since only the surface is melted, the bulk of the core remains at a lower temperature than the molten plastic comprising the shell and still acts as a heat sink. Preheating of the core surface may be accomplished by a preheater 96 upstream of the die (see FIG. 4) or incorporated in the die upstream of the interior portion 61. Such a preheater may utilize electric heat, flame, hot oil, or other well known heat transfer methods.

Optionally, the core may be made with an outer layer that has a lower melting point than the rest of the core, and which could provide enhanced bonding with the plastic shell and preclude the need for preheating the core since the molten plastic would melt the outer layer. Such materials may include lower melting thermoplastics and adhesives.

A pusher (not shown) may be provided to push the core and/or reinforcing bars into the die. In addition, means for joining core sections may be included upstream of the die to ensure a continuous process.

When the molten plastic first enters the die, a stopper (not shown) may be used to seal the interior portion 61 of the die to accumulate the molten plastic so that it fills the die and is preshaped prior to entering the cooling and shaping station 70. The stopper is moved at a constant rate through the cooling and shaping station until an initial portion of the structural member is cooled and hardened.

The melt 52 entering the die surrounds the reinforcing bars and foams from the outside in, giving a denser foam towards the skin layer 22. The density of the foam is preferably lower towards the center of the structure and higher near the outside surface to provide optimum support for the reinforcing bars, thus contributing to the overall strength of the structure. The foam density is substantially uniform, however, along the longitudinal axis of the structure.

The elongated member is cooled and shaped by the cooling and station 70, which may utilize a vacuum to maintain the shape. This station may be a tube and shell heat exchanger which contains an opening of a predetermined cross-section which forms the elongated member into a desired cross-sectional shape (e.g., circular for marine pilings, rectangular for railroad ties). The cooling portion may also include several jets for impinging cooling water or other fluid against the peripheral surface of the elongated member. The dissipation of heat via the cooling station and the plastic core allows the molten plastic to harden into the desired shape.

The elongated member is pulled away from the die and cooling and shaping station at a controlled rate by a puller, such as a caterpillar type puller. The rate of the puller is controlled to allow sufficient foaming of the plastic mixture and to prevent deformation of the elongated member due to excessive back-pressure produced in the die.

The cutter 90 cuts the elongated member at the desired length when sufficiently cooled. The cutter may include a radial saw or any well-known cutting apparatus.

If pultruded fiberglass rods or rebar are to be used as reinforcing bars, the system shown in FIG. 4 may include additional components, such as fiber reels, resin bath, etc., upstream of the die for forming the pultruded fiberglass rods prior to feeding them into the die 60.

The present invention is suitable for many uses, such as marine pilings, telephone poles, railroad ties, etc. For use as a piling, the elongated member will typically be between about ten to sixteen inches in diameter and between about thirty to eighty feet in length of continuous structure.

The continuous extrusion method of fabrication allows for substantially any length of the piling structure to be produced in an integral fashion. Additionally, the diameter or cross-sectional shape of the piling can be altered by changing the die (or portions thereof) and cooling and shaping station.

It will be apparent to those skilled in the art that various modifications and variations can be made in the elongated member of the present invention without departing from the spirit or scope of the invention. For example, the core may be used to support reinforcing elements in a mold, and a plastic melt may be injected into the mold to surround the core and reinforcing elements to form the desired product. Thus, it is intended that the present invention cover the modifications and the variations of this invention provided they come within the scope of the appended claims and their equivalents.

What is claimed is:

1. A method of producing an elongated, substantially rigid structural member suitable for use as a marine piling or structural element comprising the steps of:

providing a solid, substantially rigid plastic core element having a longitudinal axis and an outer periphery;

providing a plurality of discrete, substantially rigid reinforcing bars each having a longitudinal axis;

providing an extrusion die having a longitudinal extrusion axis and a predetermined cross-sectional shape and area;

continuously pushing the core element by an external means axially into the extrusion die with the longitudinal axis thereof arranged substantially coincident with the longitudinal extrusion axis of the die, the core element having a first temperature;

feeding the plurality of discrete reinforcing bars into the die with the longitudinal axes thereof spaced from the outer periphery of the core element and arranged substantially parallel to the longitudinal axis of the core element;

continuously feeding a molten plastic into the die at a second temperature greater than the first temperature of the core element;

flowing the molten plastic around and in contact with the outer periphery of the core element and the reinforcing bars;

continuously extruding the molten plastic through the die together with the core element and reinforcing bars to form the molten plastic into a continuously extruded member with an outer surface; and transferring heat from the molten plastic from the outer surface of the extruded member and simultaneously transferring heat from the molten plastic to the core element to increase the overall cooling rate of the molten plastic and thereby increase the production rate of the elongated structural member.

2. The method of claim 1, including the steps of providing a plurality of solid core elements and joining the core elements together upstream of the die.

3. The method of claim 1, including the steps of foaming the molten plastic as it is fed into the die and continuously extruding an unfoamable molten plastic onto the outer surface of the extruded member to form an unfoamed plastic skin layer on the extruded member.

4. The method of claim 3, wherein the molten plastics are coextruded through the die.

5. The method of claim 1, including the step of pushing the reinforcing bars into the die.

6. The method of claim 1, including the step of heating the outer periphery of the core clement to a temperature greater than said first temperature prior to the core element entering the die to improve bonding between the plastic core element and the molten plastic.

7. The method of claim 1, wherein the first temperature of the core element is ambient temperature.

8. The method of claim 1, including the step of chilling the core element to a temperature lower than ambient temperature prior to the core element entering the die.

9. The method of claim 1, including the step of adding chopped fiberglass to the plastic of the molten plastic.

10. The method of claim 1, including the step of foaming the molten plastic in the die.

11. The method of claim 1, wherein the predetermined cross-sectional shape of the die is circular and the core element has a circular cross-section, the step of feeding the reinforcing bars including arranging the bars in substantially equi-angular relation about the longitudinal axis of the core element.

12. The method of claim 1, including the step of continuously extruding the core element upstream of the die and cooling the core element to the first temperature prior to the core element entering the die.

13. The method of claim 1, wherein the core element has an outer layer of plastic with a lower melting point than the molten plastic and including the step of melting at least part of the outer layer of the core element with the molten plastic to improve bonding therebetween.

14. The method of claim 1, wherein the predetermined cross-sectional area of the die is 78.5 $in^2$ or more.

15. The method of claim 1, including the step of pulling the continuously extruded member from the die and cutting the extruded member transversely into individual members having lengths suitable for use as marine pilings, marine structural elements, telephone poles or railroad ties.

16. The method of claim 1, wherein the reinforcing bars are fiberglass rebar or steel rebar.

17. The method of claim 1, wherein the core element and molten plastic include high and low density polyethylene.

18. The method of claim 1, including the step of adding fillers to the molten plastic.

19. The method of claim 1, including the step of adding a colorant to the molten plastic.

20. The method of claim 1, wherein the cross-sectional area of the core element is about one-half the total cross-sectional area of the extruded member.

* * * * *